UNITED STATES PATENT OFFICE.

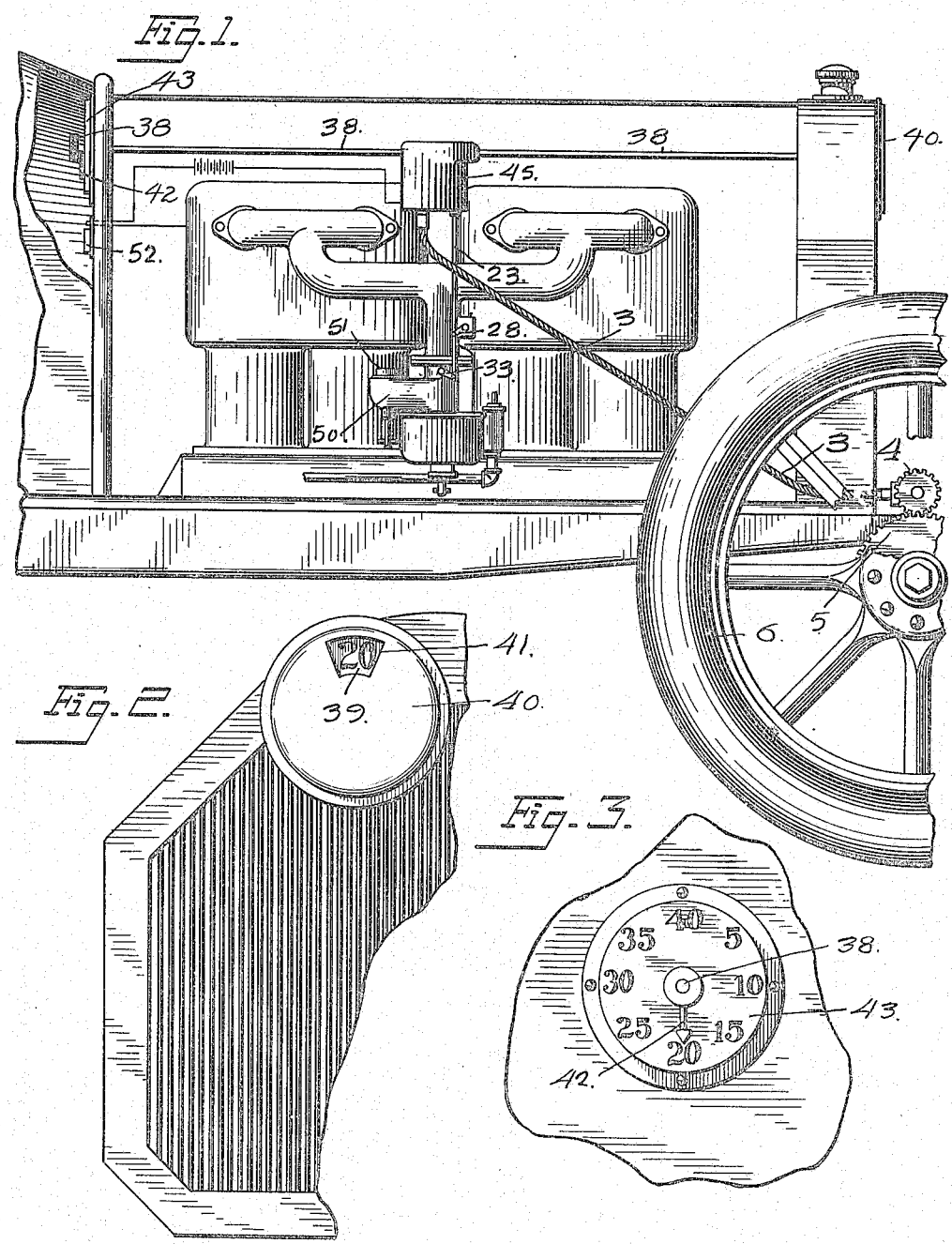

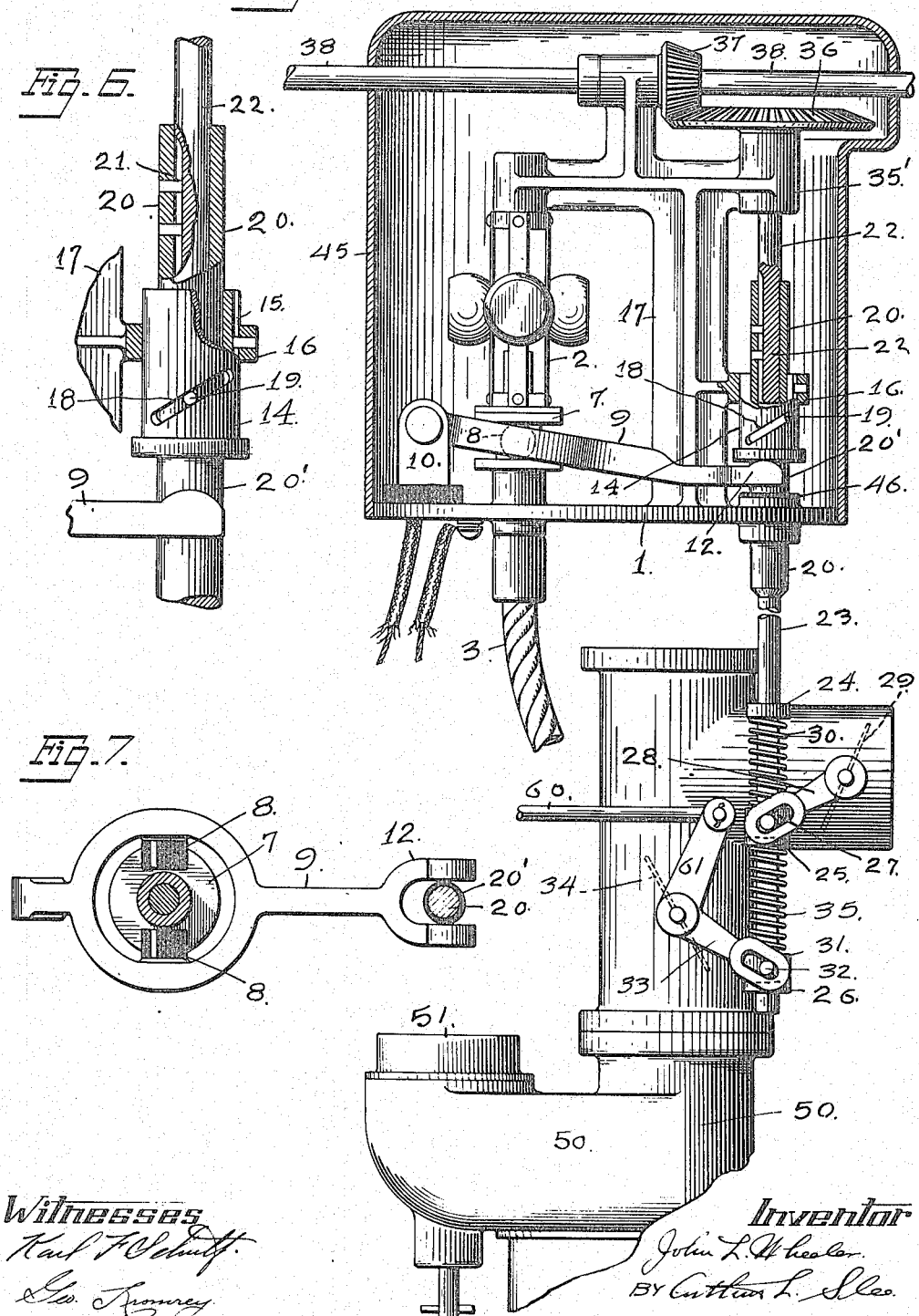

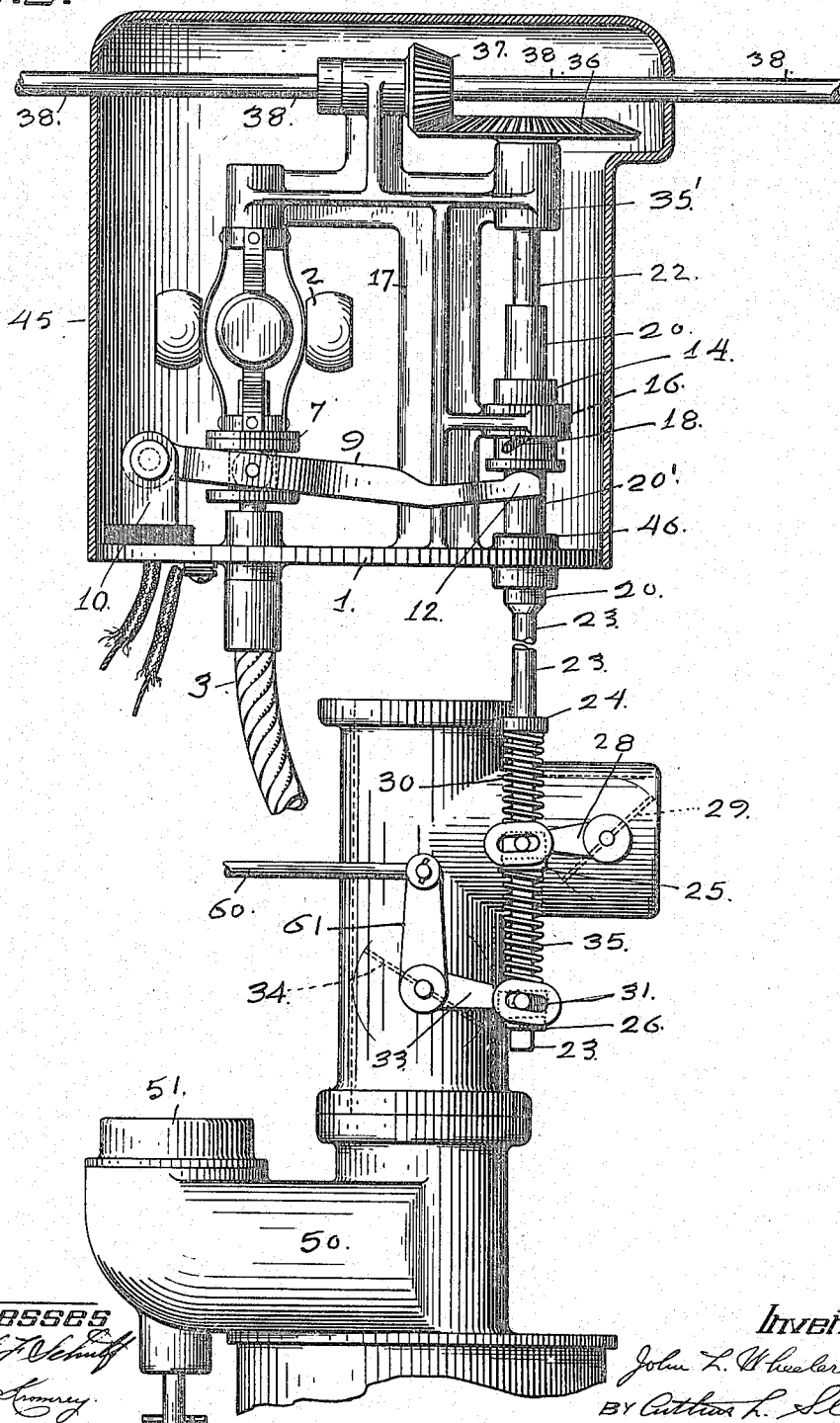

JOHN L. WHEELER, OF NAPA, CALIFORNIA.

VEHICLE SPEED INDICATOR AND CONTROLLER.

1,122,181. Specification of Letters Patent. Patented Dec. 22, 1914.

Application filed March 18, 1914. Serial No. 825,675.

*To all whom it may concern:*

Be it known that I, JOHN L. WHEELER, a citizen of the United States, residing in the city and county of Napa and State of California, have invented a new and useful Improvement in Vehicle Speed Indicators and Controllers, of which the following is a specification.

My invention relates to automatic speed controllers and indicators for automobiles and the like wherein the carbureter is cut out from the intake manifold by means of a fly-ball governor, driven from one of the wheels, when the speed of the vehicle reaches a pre-determined velocity; and wherein the operating mechanism may be adjusted to be operated at various speeds, said adjusting means being arranged to indicate conspicuously upon the front of the vehicle, the speed for which the controller is set, and the objects of my invention are first, to provide improved means for automatically cutting out the carbureter from the intake manifold when the velocity of the vehicle has attained a pre-determined speed; second, to provide improved means for regulating the speed at which the carbureter will be cut out; third, to provide means for indicating the speed for which the controller is set; and fourth, to provide means for sounding an alarm just previous to the cutting out of the said carbureter. I accomplish these features by means of the device illustrated in the drawings forming a part of the present specification wherein like characters of reference are used to designate similar parts throughout the said specification and drawings and in which—

Figure 1 is a broken view of a front portion of an automobile with the hood removed, disclosing the manner in which the device is secured above the carbureter, and the flexible drive between the device and one of the front wheels. Fig. 2 is a broken front elevation of a radiator disclosing the means for indicating the speed for which the controller is set. Fig. 3 is a broken detailed view of a portion of the dash-board disclosing the stationary disk and means whereby the speed at which the device is set to be operated, is indicated and by means of which the speed at which the said device is to be operated may be set or determined. Fig. 4 is a side elevation of the controlling means with the front portion of the housing removed, showing the manner in which the mechanism is connected to valves between the carbureter and intake manifold, said parts being shown in a normal position. Fig. 5 is a view similar to Fig. 4 but with the parts shown in an operating position. Fig. 6 is a broken sectional view of the means for adjusting the valve actuating mechanism and Fig. 7 is a detailed view of the operating lever showing the manner in which the same is connected to and insulated from the governor.

Referring to the drawings, the numeral 1 is used to designate a suitable base 1 in which is rotatably mounted the fly-ball governor 2 driven by means of the flexible drive shaft 3 and pinion 4 which meshes in the usual manner with a suitable gear 5 on one of the front wheels 6 of the vehicle. A grooved collar 7 of the governor 2 is arranged to engage the insulating rollers 8 of the operating lever 9 pivotally secured to the insulated standard 10. The bifurcated outer end 12 of the lever 9 rests normally on the insulation 46 of the base plate 1 and directly under the sleeve 14 which is slidably mounted within and feathered to a ring 16 integral with the standard 17. The sleeve 14 is provided with an inclined slot 18 arranged to engage a pin 19, secured to the tubular extension 20 of the operating rod 23, the said tubular extension being feathered to a vertical shaft 22. The operating rod 23 is provided with the collars 24, 25 and 26. Between the collars 24 and 25 is loosely mounted a collar 27 arranged to engage the arm 28 of the air inlet valve 29. A spring 30 interposed between the collars 27 and 24 is for the purpose of retaining the said collar 27 on the collar 25 and consequently the air inlet valve 29 in a closed position. A second collar 31 is also loosely mounted on the rod 23 and is provided with the pin 32 arranged to engage the arm 33 of the gas valve 34. A spring 35 is interposed between the loose collar 31 and the fixed collar 25 for the purpose of retaining the collar 31 on the collar 26 and the gas valve 34 in an open position.

The upper end of the vertical shaft 22 is rotatably mounted in a suitable bearing 35' of the standard 17 and has a beveled gear 36 secured to the upper end thereof, said gear 36 meshing with a beveled pinion 37 on the shaft 38. The shaft 38 extends beyond the housing 45 in both directions and has a numbered disk 39 secured to the front end thereof, said disk being housed within a suitable housing 40 on the front of the radiator of the vehicle. The housing 40 is provided with an aperture 41 through which one numeral only on the disk 39 may be displayed at a time. The rear end of the shaft 38 is rotatably mounted within the center of a stationary numbered disk 43 and is provided with an arm or pointer 42.

The gas intake valve is provided with the usual arm 61 operated by the rod 60 for cutting out the carbureter from the dash-board. From the standard 10 a line leads through a battery to a buzzer or other suitable alarm 52 on the dash-board of the vehicle and from the buzzer 52 a suitable electrical connection is made to the frame of the motor to which the controlling device is secured.

The operation is as follows: The bifurcated end 12 of the lever 9 rests normally upon the insulation 46. While the vehicle is running the gear 5 on the wheel 6, through the pinion 4 and flexible drive shaft 3, will rotate the fly-ball governor 2 and will cause the collar 7 thereof to engage the insulated rollers 8 and lift the end 12 of the lever 9 against the sleeve 14. The end 12 of the lever 9 being insulated from the sleeve 20 as at 20' (see Fig. 7 of the drawings) it is obvious that when the said end 12 engages the said sleeve 14 an electric circuit will be closed through a buzzer 52 which will sound an alarm and indicate to the driver of the vehicle that he is traveling at the speed for which the controller is set. If the signal is ignored by the driver and the speed of the vehicle is accelerated, such acceleration will cause the collar 7 of the fly-ball governor 2 to raise the lever 9 and the sleeve 14. The sleeve 14 by means of the pin 19 in the slot 18 thereof will raise the tubular extension rod 20, rod 23 and the collars 25 and 26 thereon which will close the gas valve 34 and open the air intake valve 29, thereby weakening the mixture of gas which is being drawn into the cylinders of the motor through the carbureter 50 and its air intake 51. As the mixture is weakened the force of the explosions within the motor will be decreased accordingly and cause the vehicle to travel slower thereby lowering the collar 7, the lever 9, rod 23 and opening the gas intake valve 34 and closing the air intake valve 29, thereby providing a greater supply of gas which will again accelerate the speed of the motor until in the hereinbefore mentioned manner the valve 29 will be opened and the valve 34 closed. It is obvious from the foregoing that the speed of the vehicle will be effectively and automatically controlled.

It is evident that if the sleeve 14 were raised the lever 9 would have to be raised a correspondingly greater distance before the end 12 thereof will come in contact with and raise the said sleeve 14 and thereby shut off the gas to the motor. In other words, the speed which may be attained by the vehicle before the carbureter 50 is cut out, is in proportion to the distance between the end 12 of the lever 9 and the under surface of the sleeve 14. This distance may be adjusted and the speed for which it is set be conspicuously displayed on the front of the vehicle in the following manner: If it is desired that the vehicle shall not travel above 30 miles an hour the pointer 42 is turned to the numeral 30 on the stationary disk 43 on the dashboard of the vehicle. This will cause the shaft 38 to rotate the disk 39 on the other end thereof so that the numeral 30 will be displayed through the aperture 41 of the housing 40. Simultaneously the gear 37 on the shaft 38 will partially rotate the gear 36 on the vertical shaft 22 secured thereto. The vertical shaft 22 will in turn rotate the tubular extension 20 feathered thereto and cause the pin 19 thereon to raise the sleeve 14 a proportionate distance by means of the inclined slot 18 through which the said pin 19 travels. This will raise the under surface of the sleeve 14 a distance above the end 12 of the lever 9 which will require a velocity of 30 miles per hour to operate the governor 2 at a sufficient speed to raise the collar 7 and lever 9 and bring the end 12 thereof in contact with the said sleeve 14. As the tubular extension 20 is feathered to the vertical shaft 22 it is obvious that the said extension 20 may be raised independently of the said vertical shaft 22. It is also evident that the sleeve 14 being feathered to the collar 16 is thereby held against rotation so that instead of rotating when lifted by the end 12 of the lever 9 it will raise the tubular extension 20 by means of the pin 19, the said extension 20 being also held against rotation by being feathered to the vertical shaft 22 as hereinbefore described. If it is desired to cut out the carbureter in the usual manner by means of the rod 60 and arm 61 of the gas valve 34, the collars 27 and 31 by means of which the valves 29 and 34 are operated by the speed controller, will be moved upwardly against the tension of the springs 35 and 30, the said springs returning the said collars 27 and 31 to their normal position on the collars 25 and 26 respectively, when the said rod 60 returns the valve 34.

It is obvious from the foregoing that I have provided improved means for controlling the speed of a motor vehicle, means for adjusting the speed for which the controller is set and means for indicating the speed for which the controller is set.

The details of construction being so susceptible to variation I do not wish to confine myself to the precise construction shown herein but rather to avail myself of any modifications which may fall properly within the scope of my invention.

Having thus described my invention what I claim as new and desire to secure by Letters Patent is—

1. In a speed controller and indicator, the combination with a carbureter and an intake manifold of a suitable fly-ball governor operatively connected to and driven from one of the wheels of a vehicle, a gas valve and an air valve within the manifold and above the carbureter; a rod connected to the air and gas valves; an adjustable sleeve secured to the upper end of the said rod; and a lever operatively connected to the governor and arranged to raise the sleeve and the rod and to close the gas valve and open the air valve when the governor attains a pre-determined velocity.

2. In a speed controller and indicator, the combination with a carbureter and an intake manifold of a suitable fly-ball governor operatively connected to and driven from one of the wheels of a vehicle; a gas valve and an air valve within the manifold and above the carbureter; a rod connected to the air and gas valves; an adjustable sleeve secured to the upper end of the said rod; a lever operatively connected to the governor and arranged to raise the sleeve and the rod and to close the gas valve and open the air valve when the governor attains a pre-determined velocity; and means for regulating the distance between the lever and the adjustable sleeve on the tubular extension.

3. In a speed controller and indicator, the combination with a carbureter and an intake manifold of a suitable base plate; a fly-ball governor rotatably mounted upon the base plate; a flexible drive between the said governor and one of the wheels of the vehicle; a gas valve and an air valve within the manifold and above the carbureter; a rod connected to the said valves and having a tubular extension with a pin thereon at the upper end thereof; a sleeve loosely mounted upon the extension and having an inclined slot therein arranged to engage the pin on the tubular extension; an insulated lever pivotally secured to the base plate and having its outer end normally away from and under the sleeve on the tubular extension; and adapted to be raised by the governor and lift the sleeve on the tubular extension thereby raising the tubular extension and opening the air valve and closing the gas valve within the manifold; and means for adjusting the distance between the sleeve on the tubular extension and the end of the insulated lever.

4. In a speed controller and indicator, the combination with a carbureter and an intake manifold of a base plate; a fly-ball governor rotatably mounted upon the base plate; a flexible drive shaft between the governor and one of the wheels of a vehicle; a gas valve and an air valve within the manifold and between the carbureter and the said manifold; a rod secured to the gas and the air valves, and having a tubular extension with a pin thereon near the upper end thereof; a sleeve loosely mounted upon the tubular extension and having an inclined slot therein arranged to engage the pin on the tubular extension; means for holding the sleeve against rotation; means adapted to rotate the tubular extension and cause the pin thereon to raise the sleeve by means of the slot therein; means for indicating the speed for which the controller is set; a buzzer having one electrical connection to the base plate and another to a battery; an insulated lever pivotally secured to the base plate and adapted to be lifted by the governor and lift the sleeve on the tubular extension and thereby close the gas valve and open the air valve when the said governor attains the speed indicated by the indicating means and to close an electric circuit between the battery and the buzzer by contact with the said sleeve.

5. In a speed controller and indicator, the combination with a carbureter and an intake manifold of a base plate; a gas and an air valve within the manifold and above the carbureter; a rod connected to the gas and air valves and having a tubular extension with a pin thereon; a sleeve loosely mounted upon the tubular extension and having an inclined slot therein arranged to engage the pin on the said extension; means for holding the sleeve against rotation; a vertical shaft rotatably mounted upon the base plate and feathered within the tubular extension; a beveled gear secured to the vertical shaft; a horizontal shaft extending from the dashboard of a vehicle to the radiator and having a numbered disk on the front end and a pointer on the rear end thereof, and a beveled pinion meshing with the beveled gear on the vertical shaft; a buzzer having a connection with the insulated lever and a connection through a battery to the base plate; and a fly-ball governor rotatably mounted upon the base plate and having a flexible drive shaft connected thereto and to one of the wheels of the vehicle, the said governor being adapted to raise the lever and the sleeve on the tubular extension, close the electrical circuit through the buzzer, and to open the air valve and close the gas valve when the said governor has attained a speed indicated by one of the numbers on the numbered disk on the front end of the horizontal shaft.

In witness whereof I hereunto set my signature in the presence of two subscribing witnesses.

JOHN L. WHEELER.

Witnesses:
PETER W. MURPHY,
EVERETT WILLIAMS.